F. G. EPPLEY.
LIQUID SEPARATOR.
APPLICATION FILED OCT. 21, 1907.
951,806.
Patented Mar. 15, 1910.
2 SHEETS—SHEET 2.
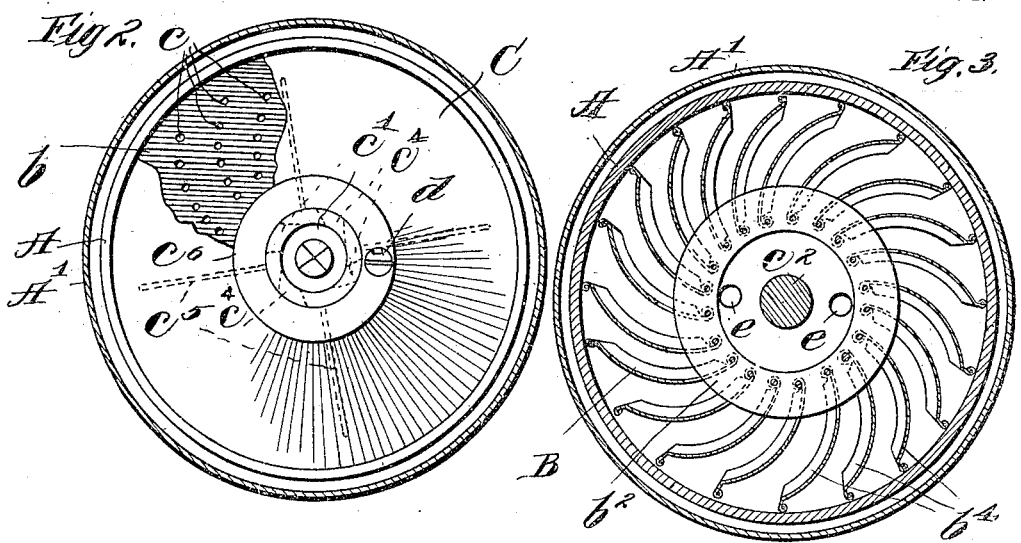
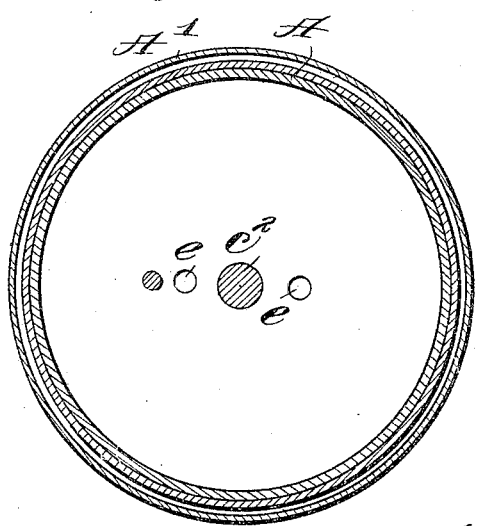
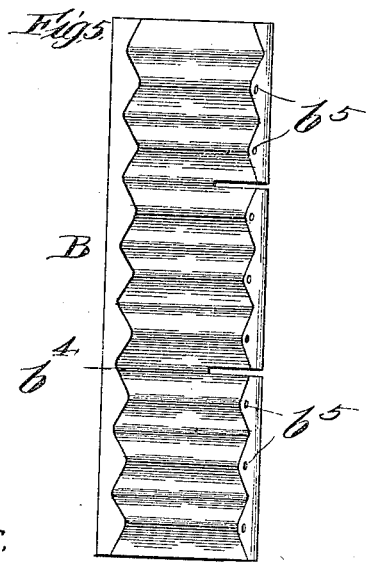
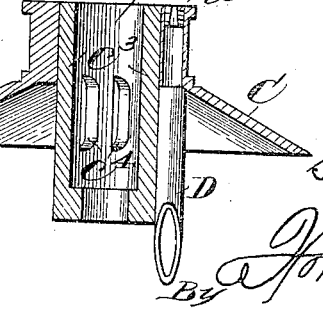

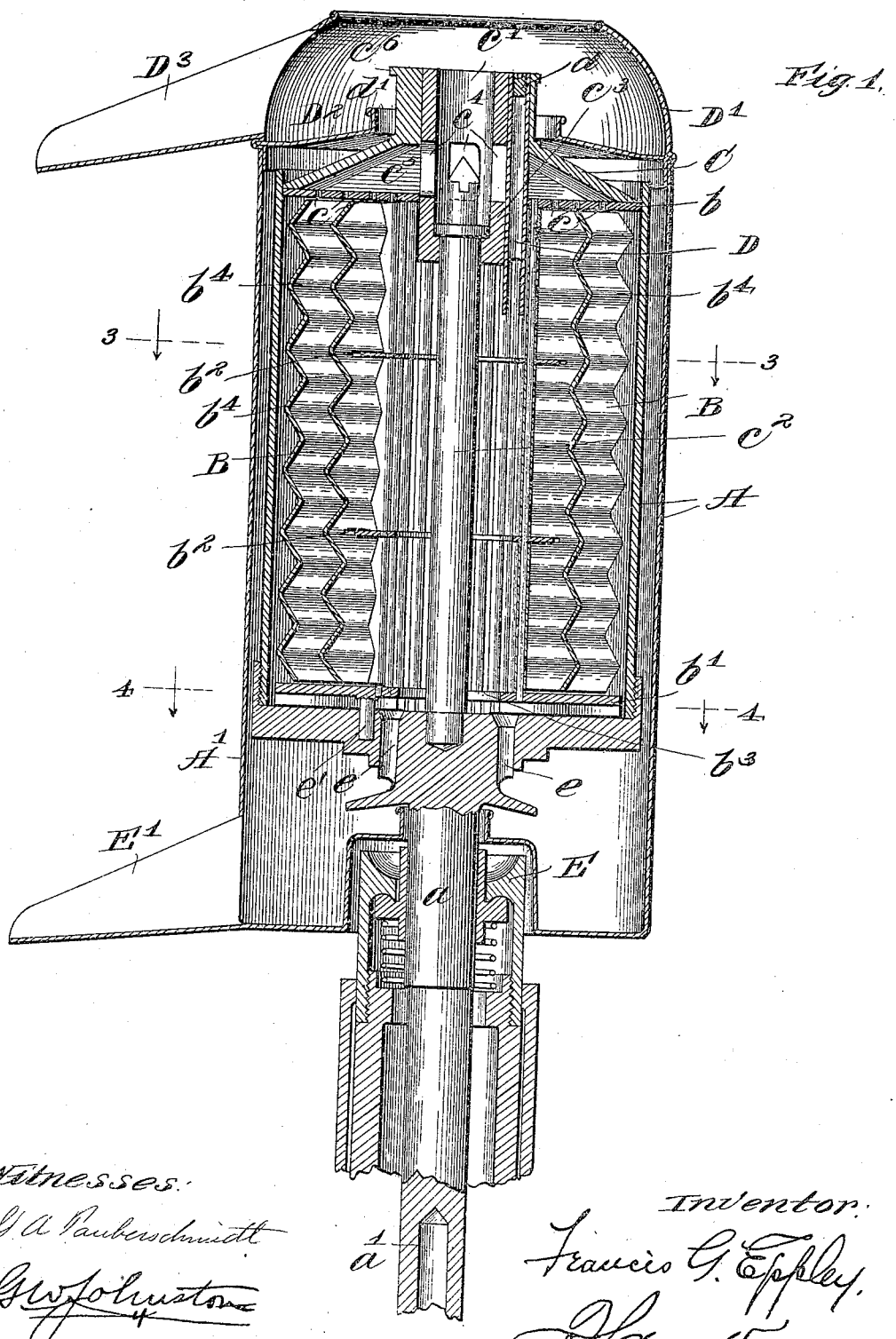

UNITED STATES PATENT OFFICE.

FRANCIS G. EPPLEY, OF CHICAGO, ILLINOIS, ASSIGNOR TO ALBAUGH-DOVER CO., OF CHICAGO, ILLINOIS, A CORPORATION OF ILLINOIS.

LIQUID-SEPARATOR.

951,806.   Specification of Letters Patent.   Patented Mar. 15, 1910.

Application filed October 21, 1907. Serial No. 398,370.

*To all whom it may concern:*

Be it known that I, FRANCIS G. EPPLEY, a citizen of the United States, residing at Chicago, Illinois, have invented certain new and useful Improvements in Liquid-Separators, of which the following, taken in connection with the drawings, is a description.

My invention has for its object the production of a machine for separating liquids of different specific gravities, and is designed in this instance to be used more particularly for separating cream from milk.

In the operation of the machine the liquid of the higher specific gravity will occupy the zone of high centrifugal force, and the liquid of the lower specific gravity will occupy the zone of lower centrifugal force. In the separation of the cream globules from the milk, it is necessary for the cream to move toward the inner portion of the centrifugal bowl. When the cream globules are grouped together and having only a small amount of milk mixed therewith, they will travel to the cream wall easier and quicker than if they were mixed with the milk.

Therefore one of the objects of this invention is to provide a separator having a plurality of wings which will separate the cream globules from the milk.

A further object of my invention is the novel form of wings or blades used, having perforations therethrough which facilitates the separation of the cream globules from the milk globules, the corrugated wings collecting the cream globules more rapidly, the perforations in the wings permitting the cream to pass rapidly through the machine and out into the receptacle. It thereby increases the capacity of the machine by increasing the rapidity of the separation.

In the accompanying drawings forming part of this specification, and in which like letters of reference indicate corresponding parts, I have illustrated one form of device embodying the principal features of my invention, although the same may be carried into effect in other ways without in the least departing from the spirit thereof, and in these drawings Figure 1 is a vertical sectional view taken through the center of the machine; Fig. 2 is a top plan view with part of the cap broken away; Fig. 3 is a top plan view with the cap and disk removed showing the position of the wings when the separator is in operation; Fig. 4 is a transverse cross section; Fig. 5 is a detail of one of the corrugated wings; Fig. 6 is a sectional detail of the cap.

In carrying out my invention A represents a centrifugal separating bowl supported inside of the receptacle A'. The separator bowl is rotatably mounted upon a spindle $a$. The lower end of the spindle $a$ is provided with an angular opening $a'$, into which is fitted an angular stud which is carried by the driving shaft (not here shown). Inside of the bowl A are a plurality of corrugated wings B supported in vertical position between the upper and lower disks $b$, $b'$. These wings are pivotally secured at their inner edges to the rings $b^2$ $b^2$, thus when assembled, forming a circular series of wings, leaving a central opening $b^3$ concentric with the bowl A. Each of the wings B is curved from the inner to the outer edge thereof on a line transverse of its length, as shown in Fig. 3. These wings are also provided with a plurality of corrugations, $b^4$ following the aforesaid lines of curvature, and these corrugations are so arranged that when assembled the wings will nest together for insertion into the bowl A. Along the pivotal edge of each of the wings B and between each corrugation I have provided the apertures $b^5$, the purpose of which will be hereinafter explained.

The upper disk $b$ is provided with a plurality of perforations $c$, these perforations being arranged upon curved lines, extending from the center to the circumference of the disk as shown more particularly in Fig. 2. The liquid to be separated is passed through these perforations, there being one line of perforations for each one of the corrugated wings B. This disk is adapted to fit inside of the bowl A when the separator is ready for use.

C is a cover, cone-shaped at its base, with an upwardly extending neck having a circumferential flange $c^6$ around the edge thereof. This cover is the same diameter at the base as the disk $b$ and in position rests upon said disk inside of the bowl A. A feed tube $c'$ is made separately, or formed integrally, with the neck of the cover and extends through the same and below the cone-shaped portion of the cover. Through the neck of the feed tube $c'$ and beneath the cone shaped cover are the openings $c^4$ through which the whole milk passes to enter the separating bolt. A bolt $c^2$ extends through the center opening $b^3$ and by means of screw threads or otherwise is rigidly secured to the standard $a$. This holds the cover C securely in position, and allows no tilting or sidewise movement of the mechanism while the separator is in operation. Through the wall $c^3$ of the neck of the feed tube $c'$ and beneath the cover C are the openings $c^4$ being beveled inwardly on one side thereof and outwardly on the other, as shown more clearly in Fig. 1. These beveled edges are for the purpose of deflecting the liquid to be separated in one direction. Extending radially from the wall $c^3$ between each one of the aforesaid openings $c^4$ are the wings $c^5$, which strengthen the cover C and assist in the deflection of the liquid in the direction guided by the beveled edges surrounding the openings $c^4$. Through the wall $c^3$ of the neck portion of the cover C is an elongated tube D which extends into the central opening $b^3$ inside of the series of wings. A screw $d$ is secured in the top of the tube D to regulate the opening at the top of the tube.

The neck portion of the cover C is provided at the top thereof with a flange $c^6$ over which the fluid is discharged from the tube D into a hood D′ which has an annular opening at the top thereof and which is provided with an inclined bottom $D^2$ having an annular opening therethrough through which is extended the neck of the cover C. A vertical rim $d'$ surrounds said opening in the bottom of the hood D. This hood is provided with a discharge pipe $D^3$.

The bottom of the bowl A is provided with a plurality of openings $e$ which lead from the bowl to the receptacle A′ which is arranged about the spindle $a$ and rests upon a support E. E′ is a discharge spout leading from the receptacle A′.

$e'$ is a stud projecting downwardly from the bottom of the lower disk $b'$ and fits into a socket in the bottom of the bowl A. By this engagement the wings or blades B carried on said disk $b'$ are revolved with the bowl A during the separating operation.

The operation of the separator is as follows: The milk from which the cream is to be separated is allowed to flow into the separating bowl through the opening $c'$. This milk may be contained in a receptacle discharging into said opening and regulated by a valve of any well known type. The milk passes through the openings $c^4$, $c$, into the separating bowl A and upon the wings B. The separating bowl A is being revolved at a high rate of speed (through a system of gears not here shown). The outer free edges of the wings come into close contact with the walls of the bowl A making a complete division or compartment between each wing and the one next to it. As the milk passes over these corrugated wings, the heavier particles thereof will settle in the corrugations farthest from the center in those having their concave surfaces opening toward the center. As the heavier milk occupies the corrugations of greater force, the lighter cream globules assume positions in the corrugations near the center in the outwardly opening concavity, and in this position they are protected from the action of the milk. As is well known, after the whole milk has been separated into its lighter and heavier particles, the heavier particles will assume positions of greatest centrifugal force, and the lighter or cream particles will move toward the center where they will pass through the perforations $b^5$ into the central openings $b^3$ and out through the tube D into the hood D′ and from there discharge through the spout $D^3$. The skimmed milk will pass downwardly between the wings and through the openings $e$ into the receptacle or bottom of the tank A′ where it is discharged through the spout E′.

I claim:—

1. In a liquid separator, the combination of a separator bowl, pivoted corrugated wings vertically arranged inside of said bowl, said wings having perforations along the pivoted edge thereof.

2. In a liquid separator, the combination of a rotatable separator bowl, a tank or receptacle inclosing said bowl, corrugated wings vertically pivotally secured within said bowl, said wings having perforations along the pivoted edge thereof.

3. In a liquid separator, the combination of a rotatable separator bowl, perforated wings pivotally secured vertically inside of said bowl, said wings having corrugations disposed in planes perpendicular to the axis of rotation, a cone shaped cover, and radially extending deflecting wings upon the under side thereof, substantially as described.

4. In a liquid separator the combination of a rotatable separator bowl, rings mounted concentrically within the bowl, a plurality of perforated corrugated wings pivotally secured along the vertical edge thereof to said rings, substantially as described.

5. In a liquid separator, the combination of a stationary receptacle, a rotatable separator bowl mounted within said receptacle, curved wings pivotally secured within said bowl along the vertical edge thereof, corrugations in said wings coincident with the line of curvature, and a cone shaped cover, said cover having radially extending deflecting wings upon the under side thereof, substantially as described.

6. In a liquid separator, the combination of a stationary receptacle, a rotatable separator bowl inside of said receptacle, a plurality of curved corrugated wings inside of said receptacle, said wings being vertically pivoted at a point between the center and the circumference of the bowl, the inner edges thereof having perforations and the outer edges contacting with the wall of the bowl, substantially as described.

7. In a liquid separator, a stationary receptacle, a revoluble separator bowl inside of said receptacle, a plurality of curved corrugated wings inside of said bowl, said wings being vertically connected in a circular series upon pivots transverse to the lines of curvature and so arranged that the corrugations of the wings will nest together inside of the bowl, and a cone-shaped cover having radially extending wings upon the under side thereof, substantially as described.

8. In a liquid separator, the combination of a stationary receptacle, a revoluble bowl inside thereof, perforated, corrugated wings pivotally mounted inside of said bowl along the vertical edge of the said wings, a perforated disk covering said wings and fitting inside of the bowl, a cover having a neck extending above and below the same, said neck having an opening extending vertically therethrough, and having openings through the walls thereof beneath the cover, the edges of the wall surrounding said last named openings being inwardly beveled on one side thereof and outwardly beveled on the other, substantially as described.

9. In a liquid separator, a revoluble separator bowl, a cover for said bowl, said cover having a neck extending above and below the same, said neck having an opening extending vertically therethrough, and having openings through the wall thereof beneath the cover, the edges of the wall surrounding said last named openings being inwardly beveled on one side thereof, and outwardly beveled on the other, and radial wings extending from said neck to the circumference of the cover, substantially as described.

10. In a liquid separator, a stationary receptacle, a revoluble separator bowl mounted upon a spindle inside of said receptacle, perforated, curved, corrugated wings pivotally secured around a circle inside of said bowl, a cover for said bowl, said cover being provided with a neck extending above and below the same, said neck having an opening extending vertically therethrough and having openings in the walls thereof beneath said cover, wings extending from the neck to the circumference of the cover, an elongated tube on one side of the neck, said tube extending into the central opening in the aforesaid bowl, substantially as described.

11. In a liquid separator, a stationary receptacle, a revoluble separator bowl mounted upon a spindle inside of said receptacle, perforated, curved, corrugated wings pivotally secured in a circular series concentric with said bowl, a cover having a neck extending above and below the same and having an opening therethrough, said neck also having openings in the walls thereof beneath the cover, the edges of the wall surrounding said last named openings being beveled outwardly on one side and inwardly on the other, an elongated discharge tube on one side of said neck and extending into the central opening in said bowl, a hood surrounding said cover and adapted to receive the lighter liquid discharged from said tube, said bowl being provided with openings in the bottom thereof through which the heavier liquid is discharged in the aforesaid receptacle, and a discharge pipe communicating with said receptacle, substantially as described.

In testimony whereof I have signed this specification in the presence of two subscribing witnesses.

FRANCIS G. EPPLEY.

Witnesses:
  F. H. SQUIRES,
  A. F. YOGGY.